Aug. 14, 1928.
J. D. RICHIE
1,680,569
ANTISKID DEVICE
Filed Dec. 8, 1926  2 Sheets-Sheet 1
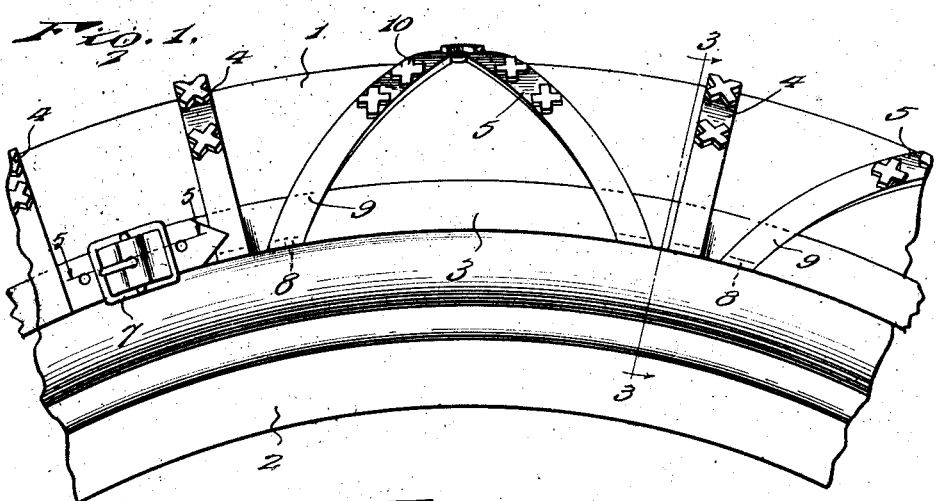
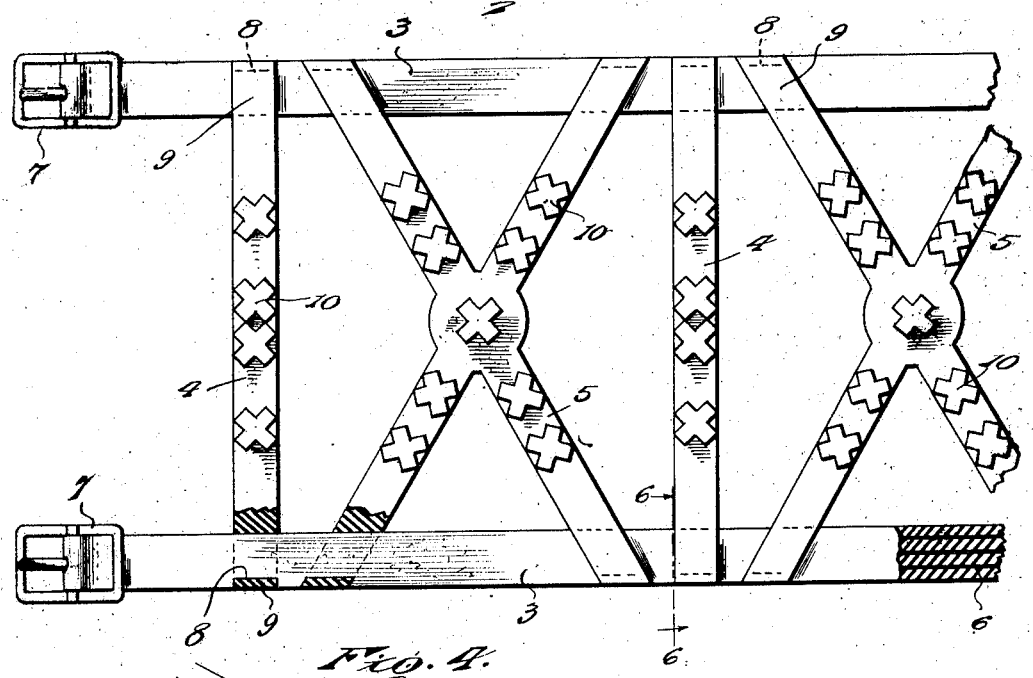
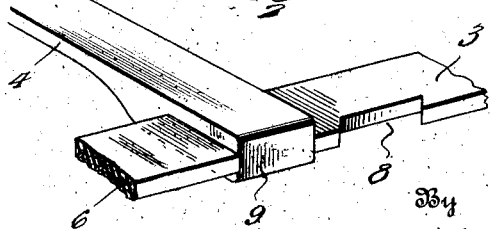
Inventor
J. D. Richie
By Lacey & Lacey, Attorneys

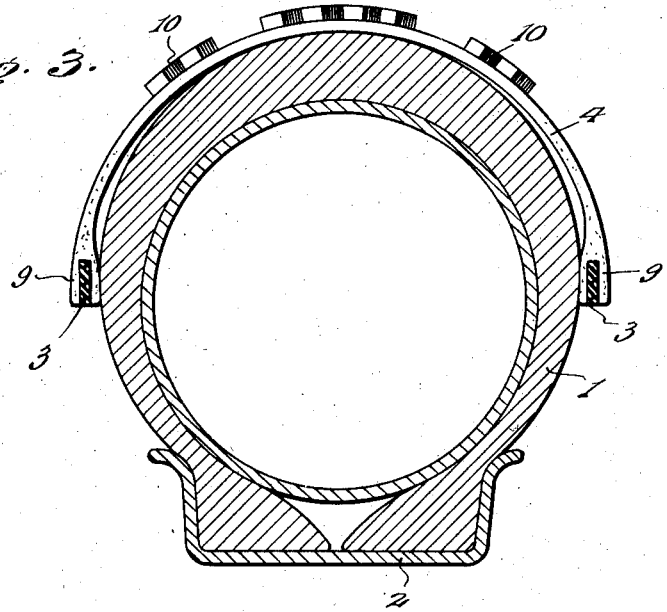
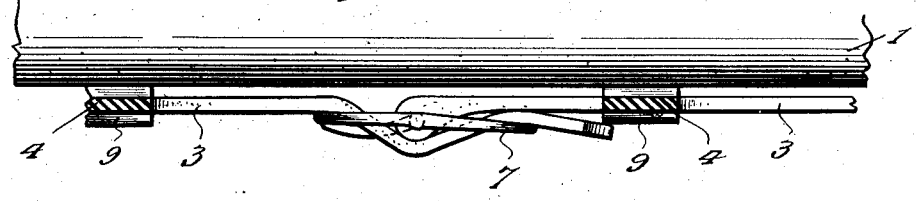
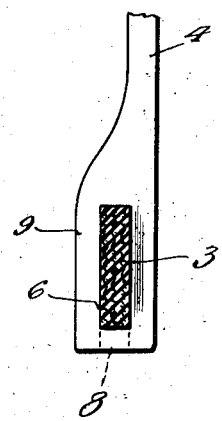

Patented Aug. 14, 1928.

1,680,569

UNITED STATES PATENT OFFICE.

JOSEPH D. RICHIE, OF CASPER, WYOMING.

ANTISKID DEVICE.

Application filed December 8, 1926. Serial No. 153,422.

This invention relates to an attachment for pneumatic and other soft tread tires to prevent skidding and assist materially in increasing the traction on wet and slippery surfaces.

The invention provides a device of the nature aforesaid which will lie close against the tire and which is free from the projections presented by the links of cross chains, hence will not injure the tire by becoming embedded in the surface thereof which is one of the objectionable features urged against the ordinary tire chain.

The invention furthermore provides an attachment of the character stated which is light, capable of being easily handled, both when being placed in position, or removed, and which admits of the cross members being readily replaced when worn or otherwise unfitted for service.

The device consists of side straps, preferably of rubber, or a combination of rubber, fabric and metal strands, provided in their outer edges with notches and cross members of corresponding material having loops at their ends to receive the side straps upon which they are slipped and retained in place by the loops becoming seated in the said notches.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a side view of portion of a tire mounted upon a rim and having an antiskid device applied thereto, embodying the invention.

Figure 2 is a diagrammatic view of a portion of the anti-skid device.

Figure 3 is a detail sectional view on the line 3—3 of Figure 1, showing the parts on a larger scale.

Figure 4 is a detail perspective view of a portion of a side strap and an end portion of a cross member threaded thereon, showing more clearly the notch in the outer edge of the strap which provides a seat for the loops at the end of the cross member.

Figure 5 is an enlarged sectional view on the line 5—5 of Figure 1, and

Figure 6 is an enlarged sectional view on the line 6—6 of Figure 2.

Corresponding and like parts are referred to in the following description and designated in the several views of the drawings by like reference characters.

The numeral 1 designates a pneumatic or other soft tread tire and 2 the usual rim upon which the tire is mounted. These parts are of well known construction and are illustrated to demonstrate the application of the invention. The device comprises companion side straps 3 and cross straps 4 and 5, the straps 4 being single and the straps 5 of X-form. The several straps are flat and may consist of rubber, or a combination of rubber and a reinforcement of textile and metal, the latter consisting of strands 6. The side straps 3 are provided at one end with a buckle 7 and the opposite end has a series of openings formed therein to receive the tongue of the buckle when the device is positioned upon the tire 1. Notches 8 are formed along the outer edge of the straps 3. These notches 8 constitute seats to receive the outer ends of the cross members 4 and 5 so as to retain them in proper position. Each of the side straps has a corresponding number of notches 8 in position to receive the ends of the members 4 and 5, as indicated most clearly in Figure 2.

Loops 9 are provided at the ends of the cross members 4 and 5 to receive the side straps 3. The loops 9 are of a length a trifle less than the width of the straps 3 so as to be retained in the notches 8. The terminal portions of the cross members are thickened and transversely slotted whereby to provide the loops 9. The cross members are threaded or slipped upon the side straps and are retained in place by the loops 9 engaging the notches or seats 8. Because of the flexible nature of the side straps and cross members, the latter may be readily replaced when required, and a broken or worn cross member may be easily detached by cutting through the loops 9, thereby obviating delays incident to removing chains. Projections 10 are molded upon the outer side of the cross members, or may be provided in any manner, and these projections may be of any outline and as shown, are cruci-form which is preferred because of the many points provided to prevent slipping.

The device is flat and light, and lies close against the tire and is held from creeping thereon because of the nature of the material and the extent of surface in contact with the tire. Moreover, the device may be rolled into a compact package and may be easily handled both when placing it in position upon a tire, or removing it therefrom.

The cross or X-form of the members 5 insures a better traction and prevents slipping. The invention obviates the usual metal side chains and metal cross chains and the wear incident to metal against metal. By having the side straps and the cross members of rubber the wear is reduced to the smallest amount possible.

Having thus described the invention, I claim:

1. An anti-skid device for soft tread tires, the same comprising side straps notched in their outer edges, and cross straps having loops at their ends to receive the side straps which are passed therethrough, the outer ends of the loops being seated in the notches of the side straps and retained in place thereby.

2. An anti-skid device for soft tread tires, the same comprising side straps notched in their outer edges, and cross straps having their terminal portions thickened and transversely apertured to provide loops, through which the side straps are passed, the outer ends of the loops being seated in the notches of the side straps and retained in place thereby, the several straps being substantially of rubber.

In testimony whereof I affix my signature.

JOSEPH D. RICHIE. [L. S.]